Figure 1:
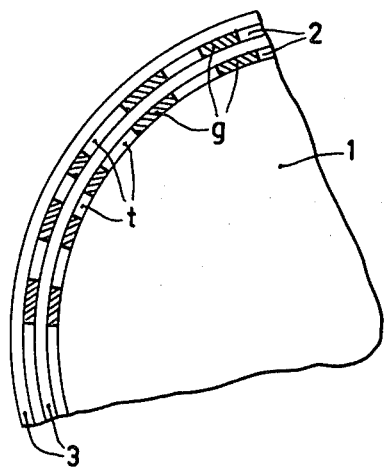

United States Patent [19]
de Lang et al.

[11] 4,084,185
[45] Apr. 11, 1978

[54] RECORD CARRIER ON WHICH INFORMATION IS STORED IN AN OPTICALLY READABLE STRUCTURE

[75] Inventors: Hendrik de Lang; Gijsbertus Bouwhuis, both of Eindhoven, Netherlands

[73] Assignee: U.S. Philips Corporation, New York, N.Y.

[21] Appl. No.: 663,268

[22] Filed: Mar. 3, 1976

Related U.S. Application Data

[63] Continuation of Ser. No. 464,843, Apr. 29, 1974, abandoned.

[30] Foreign Application Priority Data

Feb. 12, 1974   Netherlands ................ 7401858

[51] Int. Cl.² .................. H04N 5/76; G11B 23/00
[52] U.S. Cl. .................. 358/128; 179/100.3 G; 179/100.3 V; 274/42 R; 365/124
[58] Field of Search ............ 358/128, 127; 179/100.3 V, 100.3 G; 340/173 LT, 173 LM; 274/41 R, 41.6 R, 42 R, 43

[56] References Cited

U.S. PATENT DOCUMENTS

| | | |
|---|---|---|
| 3,314,052 | 4/1967 | Lohmann ............ 340/173 LM |
| 3,348,217 | 5/1964 | Snaper ............ 340/173 LM |
| 3,534,166 | 10/1970 | Korpel ............ 179/100.3 V |
| 3,627,916 | 12/1971 | Bestenreiner ............ 179/100.3 G |
| 3,688,025 | 8/1972 | Whittemore ............ 179/100.3 G |
| 3,746,783 | 7/1973 | Gerritsen et al. ............ 179/100.3 G |
| 3,753,249 | 8/1973 | Silverman ............ 340/173 LM |
| 3,842,197 | 10/1974 | Broussaud ............ 179/100.3 G |

*Primary Examiner*—Raymond F. Cardillo, Jr.
*Attorney, Agent, or Firm*—Frank R. Trifari; Simon L. Cohen

[57] ABSTRACT

A record carrier is described which is provided with an optically readable structure of trackwise arranged areas alternating with intermediate areas. Areas of at least two different types are provided. As a result, a high information density can be achieved. The different types of areas may also be used for centering a read beam relative to a track and for focussing the beam onto the track.

12 Claims, 7 Drawing Figures

RECORD CARRIER ON WHICH INFORMATION IS STORED IN AN OPTICALLY READABLE STRUCTURE

This is a continuation, of application Ser. No. 464,843, filed Apr. 29, 1974, now abandoned.

The invention relates to a record carrier on which information, for example video and/or audio information, is stored in an optically readable structure of trackwise arranged areas alternating with intermediate areas, which areas have a different influence on a read beam of radiation than the intermediate areas and the lands between the tracks, the information being contained in the spatial frequency of the areas. The invention also relates to an apparatus for reading such a record carrier.

In this specification "tracks" is to be understood to mean track portions which, viewed in the lateral direction of the track portions, are adjacent to each other. For a round disk-shaped record carrier a track is a track portion which extends along one revolution on the record carrier. A "spiral track" is the total of quasi-concentric tracks which merge into each other on a round disk-shaped record carrier. A "track section" is a portion of a track encompassing one or more of said areas.

It has been proposed, inter alia in "Philips' Technical Review" 33, No. 7, pages 177 – 193 to record a color television program in the record carrier described above. The repetition frequency of the areas, which consist of pits pressed into the record carrier surface, contains information about the luminance signal, while chrominance and/or audio signals can be derived from the modulation of the lengths of the areas. In order that the read beam can discriminate between the information in a track being read from the information in the adjacent tracks, spaces or "lands" must generally be provided between adjacent tracks, thereby avoiding crosstalk during reading. As a result, only a part of the record carrier can be used for the storage of useful information.

Instead of providing the complete areas on the record carrier it is also possible, to merely mark the transitions between the areas and intermediate areas on the record carrier with the aid of so-called standard areas of, in principle, equal length. The information is then contained in the distances between the centers of said standard areas. The average spacial frequency of said standard areas is twice that of the areas of the record according to the aforementioned articles in Philips Technical Review. For a round record carrier in which the same amount of information is stored in an inner track as in a track at the outer circumference of the record carrier, the standard areas may become so densely packed that they can no longer be detected with satisfactory resolution.

It is an object of the invention to provide a solution for the two above-mentioned problems. A record carrier according to the invention is therefore characterized in that the trackwise arranged areas comprise at least two types of gratings, which types of gratings differ in that the directions of their grating lines are different.

In this respect the gratings of two adjacent tracks may be of different types. When reading a track the adjacent tracks disposed at either side of said track function as intermediate lands. This enables the storage of approximately twice as much information on the record carrier.

Furthermore, consecutive grating like areas of one track may be of different types, allowing said areas to be detected with satisfactory resolution at higher spatial frequencies.

The use of gratings yields the additional advantage that the direction in which the radiation of the read beam is diffracted is defined, so that the detected signal is substantially unaffected by scratches, dust particles and the like on the record carrier.

If the gratings function as standard areas, the number of grating lines per grating may be limited, and, for example, may be only two or even one.

It is to be noted that on page 1351 of "Journal of the Optical Society of America" 53 (1963) in the article "Theta Modulation in Optica", the use of gratings with differently oriented grating lines for information storage purposes is described. Here the direction of the grating lines is determined by the amplitude of the information signal, whereas in the record carrier according to the invention the information is recorded in the spatial frequency of the areas and the lengths of the areas.

Figure 2:
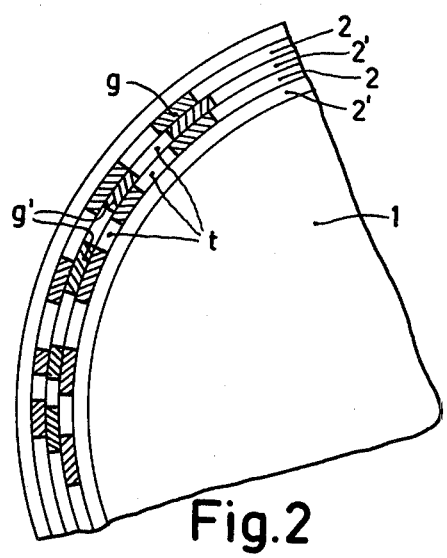
Figure 4:
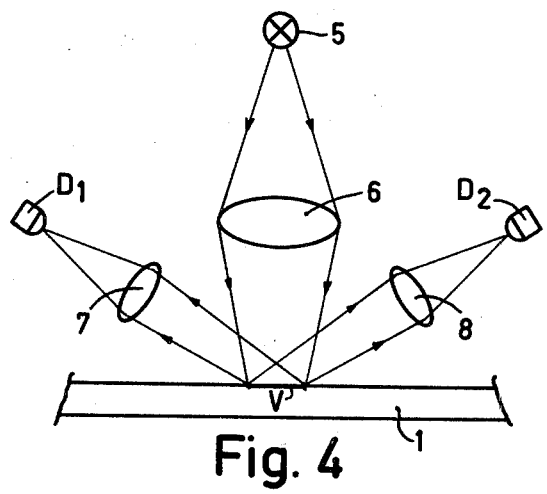
Figure 3:
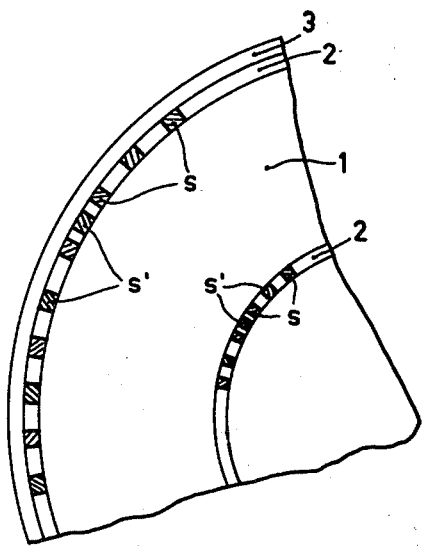
Figure 5:
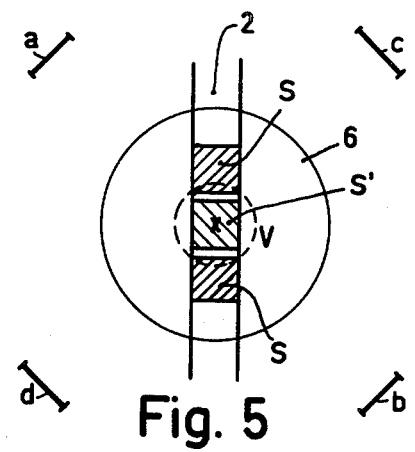
Figures 6, 7:
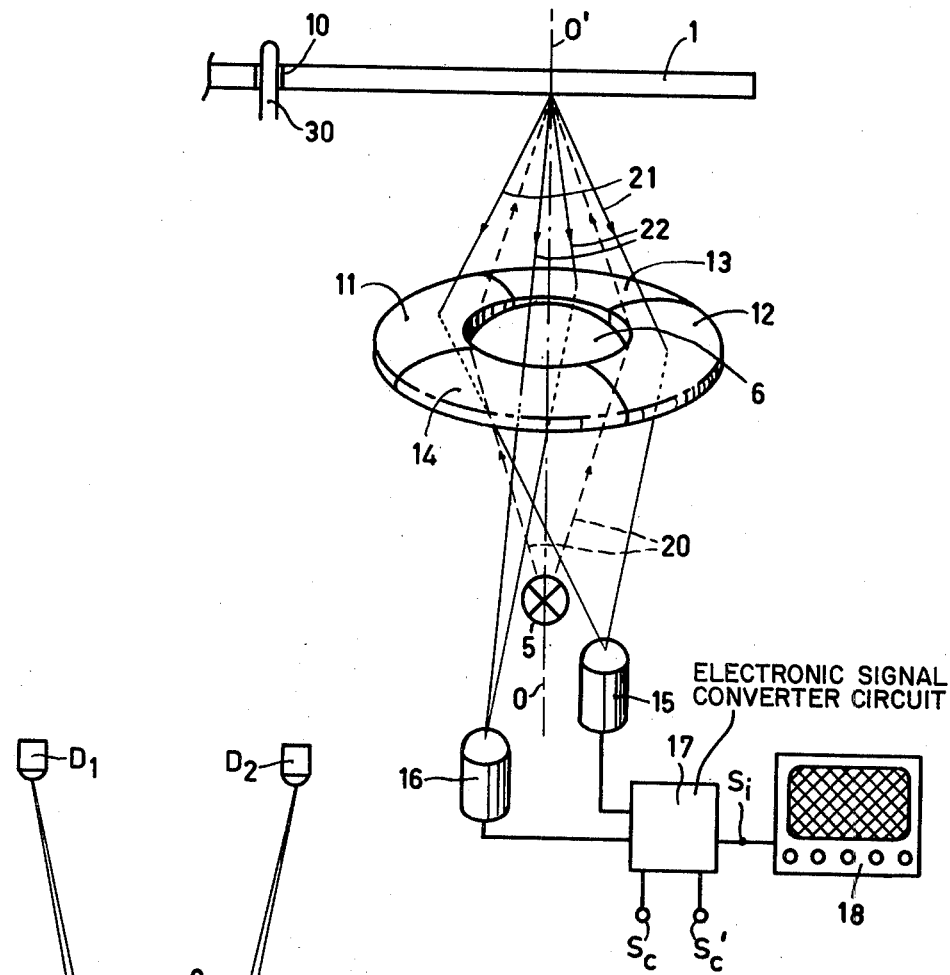

The invention will now be described in more detail with reference to the drawing, in which:

FIG. 1 shows a part of a known optical information structure of a record carrier, FIG. 2 shows a section of a record carrier according to the invention wherein the adjacent track sections of a disc abut each other and where the gratings on alternate areas in the radial direction are differently oriented, FIG. 3 shows a section of a record carrier in accordance with a further embodiment of the invention where each succeeding grating along a track is oriented in a different direction, FIG. 4 is a schematic side view of a reading mechanism for playing the records of FIGS. 2 and 3, FIG. 5 is a view from above of a different mechanism for reading a disc according to the invention, FIG. 6 is a schematic side view of a further embodiment illustrating the principle of reading such an information structure, and FIG. 7, partly in perspective, shows an embodiment of an apparatus for reading a record carrier according to the invention.

FIG. 1 shows a part of an optical information structure of a record carrier 1 to be read, in this case a round record carrier. On the record carrier a number of areas $g$ are arranged in tracks 2. The areas have a different influence on a beam of radiation which is incident on the record carrier than the intermediate areas $t$ and the structureless intermediate lands 3. The tracks may be concentric with the center of the record carrier. The record carrier may alternatively be provided with one continuous spiral track.

For reading the record carrier a read beam is directed to a radiation-sensitive detector via the record carrier and the record carrier is rotated, so that the read beam is modulated in accordance with the sequence of areas and intermediate areas in a track to be read.

The optical structure may be a transmission or a reflection structure, i.e. a read beam is modulated upon passage through the record carrier or upon reflection at the record carrier.

The areas may be such that they influence a read beam in different manners. The areas in a track may be of one type, while the areas of adjacent tracks are of another type, as shown in FIG. 2. When reading a first track 2 the areas ($g'$) of a second track 2' are not observed, so that the latter track functions as an intermediate strip just like the land 3 in FIG. 1. However, the track 2' does contain useful information. When reading said track 2' the adjacent tracks 2 function as lands. It will be obvious that a record carrier according to FIG. 2 can contain twice as much information as a record carrier in accordance with FIG. 1.

In the record carrier according to FIGS. 1 and 2 the information is stored in the transitions between the areas and the intermediate areas. In order to prevent that variations of parameters during the manufacture of the record carrier affect the signal which is read from that record carrier at a later stage, the transitions between the areas and intermediate areas in a track may, for example, be defined by so-called standard areas, for example in the form of standard light diffracting elements. During reading the distances between the centers of the standard areas are then determined, which distances are substantially independent of possible variations of parameters during the manufacture of a record carrier. The spatial frequency of the standard areas is twice as high as that of the areas $g$ and $g'$ of FIGS. 1 and 2. In a round disk-shaped record carrier in which each track contains the same amount of information the average spatial frequency of the areas in an inner track of the record carrier is higher (for example a factor 3) than that of the areas in an outer track. For a sufficient amount of information per revolution the standard areas in an inner track must be spaced close to each other. In order to allow the standard areas to be detected with sufficient resolution, the consecutive standard areas according to the invention may take different forms, as is shown in FIG. 3. This Figure shows only one outer track and one inner track. It is to be noted that the lengths of the areas, especially the lengths of the standard areas in the inner track of FIG. 3, are shown exaggerated relative to the radius of the tracks. As the consecutive standard areas are observed by different detectors, said areas may be arranged very close to each other and even against each other.

According to the invention, the areas $g$ and $g'$ (in FIG. 2) and the standard areas $s$ and $s'$ (FIG. 3) consist of gratings. The directions of the grating lines of the areas $g$ and the standard areas $s$ differ from those of the grating lines of the areas $g'$ and the standard areas $s'$ respectively. Preferably, the said directions are perpendicular to each other so as to ensure an optimum discrimination between the radiation originating from the various types of gratings. In order to reduce the effect of the diffraction of radiation at the edges of the track, the grating lines are preferably disposed at an angle of approximately 45° relative to the longitudinal direction of the tracks. If the information is contained in the lengths of the gratings, the number of grating lines per grating must be sufficiently high to allow the beginning and the end position of the gratings to be detected with sufficient accuracy. However, if the information is contained in the distances between the centers of the gratings, the length of a grating being no longer very significant, a small number of lines per grating, preferably two, or even one, may suffice.

FIGS. 4 and 5 illustrate how a reflecting information structure consisting of gratings can be read. FIG. 4 shows a part of a record carrier in cross-section, while FIG. 5 shows a part of an information track in top plan view.

With the aid of a lens 6 the radiation from a radiation source 5 is concentrated on a radiation spot V on a track. When the radiation is incident on an intermediate area $t$, said radiation will be reflected. However, if the radiation spot is projected onto a grating-shaped area $s$, the radiation will be diffracted upon reflection, for example towards the detectors $D_1$ and $D_2$, as is shown in FIG. 4. The direction in which the radiation is diffracted is determined by the direction of the grating lines. FIG. 5 shows the mutual orientations of the gratings $s$ and $s'$ and of the radiation sensitive surfaces of four detectors. The gratings $s$ are associated with two detectors, for example the detectors $D_1$ and $D_2$ of FIG. 4, whose radiation-sensitive surfaces are oriented in accordance with $a$ and $b$, while the detectors whose radiation-sensitive surfaces are oriented in accordance with $c$ and $d$ are associated with the gratings $s'$. The radiation intercepted by the detectors with surfaces oriented in accordance with $a$ and $b$ are not influenced by the presence of the gratings $s'$. The gratings $s$ and $s'$ may be disposed very close to each other.

When reading a record carrier according to the invention it is merely required to establish whether a grating with a certain line orientation is present. It is not necessary to image any gratings. The optical system of the read apparatus may therefore be fairly simple and inexpensive. The lens 6 is, for example, a lens with a numerical aperture of 0.3 and said lens images a diffraction-limited radiation spot on the record carrier.

It is obvious that the invention may also be used in conjunction with a radiation-transmitting record carrier. The detectors, for example detectors $D_1$ and $D_2$ in FIG. 4, must then be disposed at a side of the record carrier other than the side where the radiation source which supplies the read beam is disposed.

The detectors are arranged so that they can only observe structures at the location of the read spot which extend in a specific direction. Possible scratches, dust particles etc. on the record carrier will only be observed if their orientation is the same as the orientation of the grating lines. The proposed method of reading is therefore substantially insensitive to scratches, dust particles etc. on the record carrier.

As is described in "Philips' Technical Review" 33, No. 7, pages 177 – 193, a color television signal can be recorded in a pit structure, which structure is intended to be read by means of a read beam whose diameter, at the location of the structure, is greater than the track width. The read beam emerging from the record carrier is concentrated onto a detector with the aid of a lens of such a numerical aperture that it cannot image a pit. The pits function as diffraction structures. Compared with such a pit structure a grating structure has the advantage that the signal/noise ratio is better, because only the radiation which is diffracted in a certain direction is detected. For optimum reading of the pit structure, if a read spot is projected onto a pit, the radiation beams coming from the bottom of a pit and from the adjacent record carrier surface must have a phase difference of 180° and must be of equal intensity. As a result, the depth of the pits is defined within fairly narrow limits. The dimensions of the radiation spot and of the pits will have to be adapted to each other. A read spot with which an outer track of a round disk-shaped record carrier can be read in an optimum manner will not readily be suited for correctly reading in an inner track, whose pits on the average are shorter than those of an outer track. For correctly reading all tracks an inner track would, for example, have to be made broader than an outer track. Because of the different method of reading, the problems associated with a pit structure no longer play a part in the case of an information structure consisting of gratings with grating lines of a specific orientation.

As is shown in FIGS. 4 and 5, two radiation-sensitive detectors may be used for each orientation of the grating lines, in order to obtain an as large as possible electrical signal. In order to reduce the effect of undesirable reflected light from other portions of the record on the detectors, images of the radiation spot are focussed onto the detectors $D_1$ and $D_2$ by simple lenses 7 and 8. Instead of three separate lenses 6, 7 and 8 it is also possible to use a lens 6' having a greater angle of aperture than the lens 6, which is disposed at the location of the lens 6, as is shown in FIG. 6. The central part of the new lens 6' is then used for projecting a read spot V onto the record carrier, while the peripheral zone of said lens images the gratings onto the detectors. The element 9 is a mirror which reflects a radiation beam which is incident at a certain angle to the plane of drawing towards the lens 6'. The wedge elements 4 and 4' ensure that the radiation beams which are diffracted by the record carrier 1 impinge on two detectors $D_1$ and $D_2$.

Instead of two detectors for each grating orientation it is also possible to use a combination of one detector and suitable lens elements for any grating orientation, as is shown in FIG. 7.

FIG. 7 shows an apparatus for reading a record carrier according to the invention in schematic form and partly in perspective. The record carrier is rotated by a shaft 30, driven by a motor, not shown, which shaft extends through a central opening 10 in the record carrier. The radiation beam represented by the rays 20, coming from a source 5 is focussed onto the record carrier by a lens 6. The radiation which is diffracted by the areas with a specific grating orientation, of which radiation only the rays 21 are shown, is intercepted by annular lens elements 11 and 12 which are disposed round the lens 6, and which concentrate the radiation onto one detector 15. The detector supplies an electrical signal which is modulated in accordance with the sequence of those grating-shaped areas in the track to be read, which diffract radiation towards the lens elements 11 and 12. Said signal is fed to an electronic circuit 17 in which, in known manner, a video and/or audio signal $S_i$ can be derived, which signal in its turn is applied to a conventional (color) television receiving apparatus 18. The processing of the detector signals into an information signal in the circuit 17 falls beyond the scope of the present invention and will not be described any further.

Around the lens 6 two further annular lens elements 13 and 14 are disposed. Said lens elements can concentrate the radiation, represented by the rays 22, which is diffracted by those gratings whose grating lines have an orientation which differs from that of the gratings which are imaged onto the detector 15 with the aid of the lens elements 11 and 12, onto a second detector 16. The detector 16 is also connected to the electronic circuit 17. The reference numerals 11 and 12 represent parts of a lens whose center is offset relative to the optical axis OO'. The reference numerals 13 and 14 are parts of another lens whose center is disposed either on the optical axis OO' or offset relative to said axis, but in another direction than the center of the lens constituted by 11 and 12.

An apparatus as shown in FIG. 7 enables a record carrier which is provided with grating-shaped areas with grating lines of two different orientations to be read. For reading a track with standard areas, of which the consecutive gratings are oriented differently, the two detectors 15 and 16 must be used and the signals from said detectors must be combined in the circuit 17. If the grating lines of the gratings of one track have one orientation and those of the gratings of adjacent tracks have another orientation, the two detectors 15 and 16 are required for reading the complete information on the record carrier; for reading one track, however only one detector is required.

In the last case it is possible that the adjacent tracks are to be read time sequentially. Each time after a track has been read out it is necessary to switch from the one detector to the other. It is also possible that a first amount of information is stored in a first spiral track of which the areas have a first grating orientation and that between the tracks of said spiral track a second spiral track is disposed of which the areas have a second grating orientation.

When reading a record carrier in which two adjacent tracks have different types of areas, it is possible to detect in a simple manner whether the read spot is centered on the track to be read. If a first track is read, only the detector associated with the areas of said track should receive modulated radiation; if a second detector which is associated with the areas of the adjacent track also receives modulated radiation this is an indication that the read spot is not exactly centered on the first track. The electronic circuit 17 may include provisions to convert the signal of said second detector into a control signal $S_c$ which may be employed to correct the position of the read spot, for example with the aid of a rotatable mirror in the path from the radiation source 5 to the lens 6, as proposed previously.

If during reading it is also required to know the direction of a possible positional deviation of the read spot relative to the track to be read, a record carrier according to the invention may be made in accordance with a previous proposal. In accordance with said proposal, described in the U.S. Ser. No. 442,396, filed Feb. 14, 1974, the tracks of the record carrier exhibit periodic excursions in the lateral direction of the tracks, the period of which excursions is substantially greater (for example 1000 X), than the average period of the areas in the tracks, while the amplitude of the excursions is smaller (for example, 5 X) than the track width. When reading such a record carrier the high-frequency component of the detector signal provides the information, for example video and/or audio information, while the phase of the low-frequency component of the detector signal enables the direction of a deviation between the actual and the desired position of said read spot to be derived.

According to another aspect of the invention it is possible, when reading a record carrier of which two adjacent tracks have different types of areas, to detect whether the read beam is focussed on the plane of the information structure. If there is a deviation between the actual position of the plane of the track portion to be read and the desired position of said plane relative to the read objective, the radiation spot imaged onto the record carrier will be proportionally larger. In addition to the track to be read, adjacent tracks will then also be illuminated. As a result, apart from a first detector which detects gratings with an orientation corresponding to the track to be read, a second detector which detects gratings with an orientation corresponding to the adjacent track will also receive radiation. When the read beam is properly focussed on the track to be read, there is a maximum difference between the output signals of the first and of the second detector. Said difference will decrease as the focussing of the read beam on the track to be read deteriorates. The difference between the output signals of the first and the second detector can be processed in the electronic circuit 17 to a low-frequency control signal $S_c'$ for focussing correction, for example by means of an axial displacement of the objective lens 6.

When determining a focussing error, allowance should be made for the effect of a deviation between the centers of the read spot and the track to be read. Said deviation may be determined by, for example, a record carrier having tracks which exhibit periodic excursions in the lateral direction of the tracks as described previously. The periodic signal $S_c$ which provides an indication of the error in the centering of the read spot relative to the track to be read, has a specific fixed frequency, and can thus be discriminated from the signal $S_c'$ which provides an indication of a possible focussing error. If a television program is stored in a round disk-shaped record carrier, one field being recorded per revolution, the tracks may, for example, have excursions only at the points which correspond to the line synchronizing pulses in the television signal. The frequency of the signal $S_c$ then corresponds to the line frequency in the information signal. The focussing may then be corrected so that the difference between the output signals of said first and said second detector is maximum at the zero crossings of the signal $S_c$.

During the first phase of reading, when the objective is not yet focussed on the record carrier, it is also possible to make use of the different grating orientations in adjacent tracks for coarse adjustment of the objective. At long as the read beam if focussed in a plane which is at a relatively great distance from the plane of the track to be read, the control system for centering the read spot on a track to be read is not yet operative. When the record carrier is moved in the read direction relative to the radiation source, the read spot also travels over the tracks in the lateral direction, the center of the read spot being alternately located at a track with a first grating orientation and at a track with a second grating orientation. The detectors corresponding to said grating orientations then alternately receive radiation. The amplitudes of the detector signals increase as the focussing of the read beam on the track to be read improves. These signals are in phase opposition. If the difference between the two signals is maximum, the control system for centering the radiation spot relative to the track to be read is rendered operative. Correction of the centering and fine control of the focussing is then further effected as described hereinbefore.

Instead of to a round disk-shaped record carrier the invention may also be applied to a record carrier in the form of a tape or a cylindrical record carrier.

The record carrier may also contain information other than a television program.

What is claimed is:

1. An optically readable record carrier for recorded information comprising areas of a first type serially arranged along elongated path sections, and areas of a second type serially arranged along similarly oriented further elongated path sections, and regions aligned with both types of said path sections between each area of both said first and second types of areas, the relative length of said areas of said first type, said areas of said second type, and said regions between said areas measured along the direction of elongation of said path sections corresponding to said recorded information, a first type of periodic grating having a constant spatial frequency on all of said areas of said first type, a second type of grating having a constant spatial frequency on said areas of said second type, grating lines of all of said second type of gratings being similarly oriented with respect to said path sections in a different direction then the grating lines of the first type of grating, said grating lines of said first type of grating all being similarly oriented with respect to said path sections, said regions influencing a read beam of radiation in a manner different from both said areas of said first type and said areas of said second type, each area of said first type being alternately arranged with an area of said second type in at least one of said directions transverse to said direction of elongation and along said direction of elongation.

2. A record carrier as recited in claim 1, wherein said elongated path sections and said further path sections are portions of a curved elongated track comprising a plurality of substantially circular track sections, each track section of said elongated track being situated proximate other sections of said track, said areas of said first type and said areas of said second type being separately arranged in alternate track sections, whereby succeeding areas measured in a direction transverse to the direction of elongation are provided with gratings oriented in different directions.

3. A record carrier as recited in claim 1, wherein a plurality of the path sections comprise tracks, the tracks viewed in the lateral direction of the tracks, exhibiting periodic excursions, the period of said excursions being substantially greater than the average period of the areas on the tracks, while the amplitude of the excursions is smaller than the width of the tracks.

4. A record carrier as recited in claim 1, wherein elongated path sections and the further path sections are in the form of two continuously abutting coplanar spiral tracks on a round disk, said areas of said first type being arranged in one of said tracks, and said areas of said second type being arranged in the other of said tracks, whereby succeeding areas measured in a direction transverse to the direction of elongation are provided with gratings oriented in different directions.

5. A record carrier as recited in claim 1 wherein the lengths of each of the areas of both said first and second types of areas measured along the direction of elongation of said path sections are equal, and wherein the information is stored in the form of variations in the spatial frequency of said areas of said first and second types of areas.

6. A record carrier as recited in claim 1, wherein the orientations of the grating line of the two types of gratings are perpendicular to each other, and wherein said orientations enclose an angle of 45° with the direction of elongation of said path sections.

7. A record carrier as recited in claim 1, wherein each of said gratings of said first and said second types of gratings comprise a maximum of 2 grating lines per area.

8. A record carrier as recited in claim 1, wherein each of said areas of said first type alternates with one of said areas of said second type along the direction elongation of said path sections.

9. An apparatus for reading an optically readable record carrier on which information is stored in the form of areas of a first type serially arranged along elongated path sections, and areas of second type serially arranged along similarly oriented further elongated path sections, and regions aligned with both types of said path sections between each area of both said first and second types of areas, the relative length of said areas of said first type, the areas of said second type and the regions between said areas measured along the direcion of elongation of said track sections corresponding to said recorded information, a first type of periodic grating having a constant spatial frequency on all of said areas of said first type, a second type of grating having a constant spatial frequency on the areas of said second type, grating lines of said first type of grating all being similarly oriented with respect to said path sections, gratings of all of said second type of grating all being similarly oriented with respect to said path sections and being aligned in a different direction than said grating lines of said first type of grating, said regions influencing a read beam of radiation in manner different from both said areas of said first type and said areas of said second type, each area of said first type being alternately arranged with an area of said second type in at least one of said directions transverse to said direction of elongation and along said direction of elongation, whereby said grating lines of said first type direct light in a different direction than said grating lines of said second type, said apparatus comprising a radiation source means for providing a read beam directed onto said record carrier, whereby said first and second types of areas modulate said read beam and redirect it as two angularly separated sub-beams, a separate radiation sensitive detector in the path of each of said sub-beams, and an electronic circuit for processing signals from said radiation sensitive detectors into an information signal.

10. An apparatus as recited in claim 4, further comprising a plurality of lens elements associated with each detector, said lens elements concentrating the radiation of said sub-beams onto the corresponding detector.

11. An apparatus as recited in claim 9, wherein the electronic circuit comprises a low frequency control signal for correcting the position of the read beam relative to the track to be read in response to the detector signals.

12. An apparatus as recited in claim 9, wherein the electronic circuit comprises a low frequency control signal for correcting the focussing of the read beam on the track to be read in response to the detector signals.

* * * * *